US011879592B2

(12) United States Patent
Hosoya et al.

(10) Patent No.: US 11,879,592 B2
(45) Date of Patent: Jan. 23, 2024

(54) GAS PRESSURE VESSEL

(71) Applicants: JAPAN STEEL WORKS M&E, INC., Muroran (JP); TOKYO DENKI UNIVERSITY, Tokyo (JP)

(72) Inventors: Takafumi Hosoya, Muroran (JP); Yoru Wada, Tokyo (JP); Hirokazu Tsuji, Tokyo (JP)

(73) Assignees: Japan Steel Works M & E, Inc., Hokkaido (JP); Tokyo Denki University, Tokyo (JP)

( * ) Notice: Subject to any disclaimer, the term of this patent is extended or adjusted under 35 U.S.C. 154(b) by 0 days.

(21) Appl. No.: 17/286,046

(22) PCT Filed: Sep. 12, 2019

(86) PCT No.: PCT/JP2019/035938
§ 371 (c)(1),
(2) Date: Apr. 16, 2021

(87) PCT Pub. No.: WO2020/080002
PCT Pub. Date: Apr. 23, 2020

(65) Prior Publication Data
US 2021/0381646 A1 Dec. 9, 2021

(30) Foreign Application Priority Data

Oct. 17, 2018 (JP) .................................. 2018-195537

(51) Int. Cl.
*F17C 1/00* (2006.01)
*F17C 13/06* (2006.01)

(52) U.S. Cl.
CPC .............. *F17C 1/005* (2013.01); *F17C 13/06* (2013.01); *F17C 2201/0109* (2013.01);
(Continued)

(58) Field of Classification Search
CPC .. F17C 1/005; F17C 13/06; F17C 2201/0109; F17C 2201/035; F17C 2205/0305;
(Continued)

(56) References Cited

U.S. PATENT DOCUMENTS

| | | | | |
|---|---|---|---|---|
| 4,589,564 A | * | 5/1986 | Olster | F17C 13/06 220/582 |
| 2005/0087536 A1 | * | 4/2005 | Caudill | F17C 1/14 220/586 |

(Continued)

FOREIGN PATENT DOCUMENTS

| | | |
|---|---|---|
| CN | 205101849 U | 3/2016 |
| JP | S50-29316 U | 4/1975 |

(Continued)

OTHER PUBLICATIONS

Standard Concerning Ultrahigh-Pressure Gas Equipment KHKS 0220 (2010), Mar. 31, 2010, High Pressure Gas Safety Institute of Japan, p. 26.

(Continued)

*Primary Examiner* — John K Fristoe, Jr.
*Assistant Examiner* — Laura E. Parker
(74) *Attorney, Agent, or Firm* — Potomac Law Group, PLLC

(57) ABSTRACT

A gas pressure vessel capable of performing processing of removing wrinkles on an inner surface of a dome part and preventing cracking starting from a root of a thread of a neck part is provided. In a gas pressure vessel according to one embodiment, a dome part (12) has an opening whose diameter is 90 mm or greater, and the innermost root of the thread in a female thread part (10a) into which a lid (20) is screwed is provided inside an imaginary plane (B) formed by extending an outer surface of the dome part (12) toward an opening.

6 Claims, 7 Drawing Sheets

(52) U.S. Cl.
CPC ...... *F17C 2201/035* (2013.01); *F17C 2205/0305* (2013.01); *F17C 2221/012* (2013.01); *F17C 2223/036* (2013.01); *F17C 2270/01* (2013.01)

(58) Field of Classification Search
CPC .......... F17C 2221/012; F17C 2223/036; F17C 2270/01; F17C 2205/03; F17C 2205/0302; F17C 2205/0311; F17C 2205/0323
USPC ........................................................ 220/582
See application file for complete search history.

(56) References Cited

U.S. PATENT DOCUMENTS

| | | | | |
|---|---|---|---|---|
| 2006/0096993 | A1* | 5/2006 | Takashima | F17C 1/06 220/495.01 |
| 2010/0025403 | A1* | 2/2010 | Fawley | F16J 13/12 220/288 |
| 2010/0163565 | A1* | 7/2010 | Matsuoka | F17C 13/06 220/581 |
| 2018/0257321 | A1* | 9/2018 | Maekawa | B29B 11/16 |
| 2018/0340653 | A1* | 11/2018 | Moutray | F17C 1/06 |
| 2019/0086029 | A1* | 3/2019 | Wada | F15B 1/04 |

FOREIGN PATENT DOCUMENTS

| | | |
|---|---|---|
| JP | 2004-144172 A | 5/2004 |
| JP | 2006-132746 A | 5/2006 |
| JP | 2006-291986 A | 10/2006 |
| JP | 2007-016807 A | 1/2007 |
| JP | 2008-101677 A | 5/2008 |
| JP | 2008-261352 A | 10/2008 |
| JP | 2015-158243 A | 9/2015 |
| JP | 2017-155836 A | 9/2017 |
| WO | WO 2017/150520 A1 | 9/2017 |

OTHER PUBLICATIONS

Standard Concerning Ultrahigh-Pressure Gas Equipment KHKS 0220 (2010), Mar. 31, 2010, High Pressure Gas Safety Institute of Japan, p. 63-73 (with brief English description of relevancy).
International Search Report from International Patent Application No. PCT/JP2019/035938, Nov. 19, 2019.
Extended European Search Report dated Jun. 7, 2022, in European Patent Application No. 19873209.1.
Office Action dated Jun. 14, 2022, in Japanese Patent Application No. 2018-195537.
Office Action dated Nov. 1, 2022, in Japanese Patent Application No. 2018-195537.

* cited by examiner

GAS PRESSURE VESSEL

TECHNICAL FIELD

The present disclosure relates to a gas pressure vessel, and relates to a gas pressure vessel for screwing a lid into an opening end of a body part.

BACKGROUND ART

For example, a gas pressure vessel disclosed in Patent Literature 1 has a structure in which a hemispherical dome part is extended outward from an end part of a cylindrical part and a cylindrical neck part is protruded outward from an opening provided at a top of the above dome part.

On the other hand, in a high-pressure gas pressure vessel used for a hydrogen station or the like, as disclosed in Non-Patent Literature 1, a structure in which a lid is screwed into an opening end of a cylinder (cylindrical body) is employed.

Non-Patent Literature 2 will be referred to in the description of an embodiment.

CITATION LIST

Patent Literature

[Patent Literature 1] Japanese Unexamined Patent Application Publication No. 2006-291986

Non-Patent Literature

[Non-Patent Literature 1] Standard for Ultrahigh-Pressure Gas Equipment KHKS 0220 (2010), Mar. 31, 2010, High Pressure Gas Safety Institute of Japan, p. 26
[Non-Patent Literature 2] Standard for Ultrahigh-Pressure Gas Equipment KHKS 0220 (2010), Mar. 31, 2010, High Pressure Gas Safety Institute of Japan, p. 63-73

SUMMARY OF INVENTION

Technical Problem

The present inventors have had a discussion about a gas pressure vessel in which the lid as disclosed in Non-Patent Literature 1 is screwed into an inner peripheral surface of the neck part protruded from the top of the dome part as disclosed in Patent Literature 1 and found the following problem.

In a gas pressure vessel including a dome part, wrinkles easily occur on an inner surface of the dome part, which may cause cracking which starts from the wrinkles to occur and thus cause gas inside the gas pressure vessel to be leaked. One method of preventing this problem may be to perform a process (e.g., machining) of removing wrinkles that occur on the inner surface of the dome part. However, when the inner diameter of the neck part (i.e., the dome part) is small, like in the gas pressure vessel disclosed in Patent Literature 1, it is difficult to perform the above process on the inner surface of the dome part. It is therefore required to increase the inner diameter of the neck part.

On the other hand, when the inner diameter of the neck part, i.e., the diameter of the lid, is increased, a load applied to the lid is increased as well. Therefore, there is a problem that a stress applied to a female thread part formed on the inner peripheral surface of the neck part increases and thus cracking easily occurs in the neck part, starting from a root of the thread.

Other objects or problems and novel features will be made apparent from the following description and the accompanying drawings.

Solution to Problem

In a gas pressure vessel according to one embodiment, a dome part has an opening whose diameter is 90 mm or greater, and the innermost root of a thread in a female thread part into which a lid is screwed is provided inside an imaginary plane formed by extending an outer surface of the dome part toward an opening.

Advantageous Effects of Invention

According to the embodiment, it is possible to provide a gas pressure vessel capable of performing processing of removing wrinkles on the inner surface of the dome part and preventing cracking starting from a root of a thread of a neck part.

DESCRIPTION OF EMBODIMENTS

Hereinafter, with reference to the drawings, a specific embodiment will be described in detail. However, the present disclosure is not limited to the following embodiment. Further, for the sake of clarification of the description, the following descriptions and the drawings are simplified as appropriate.

First Embodiment

<Structure of Gas Pressure Vessel>

Figure 1:
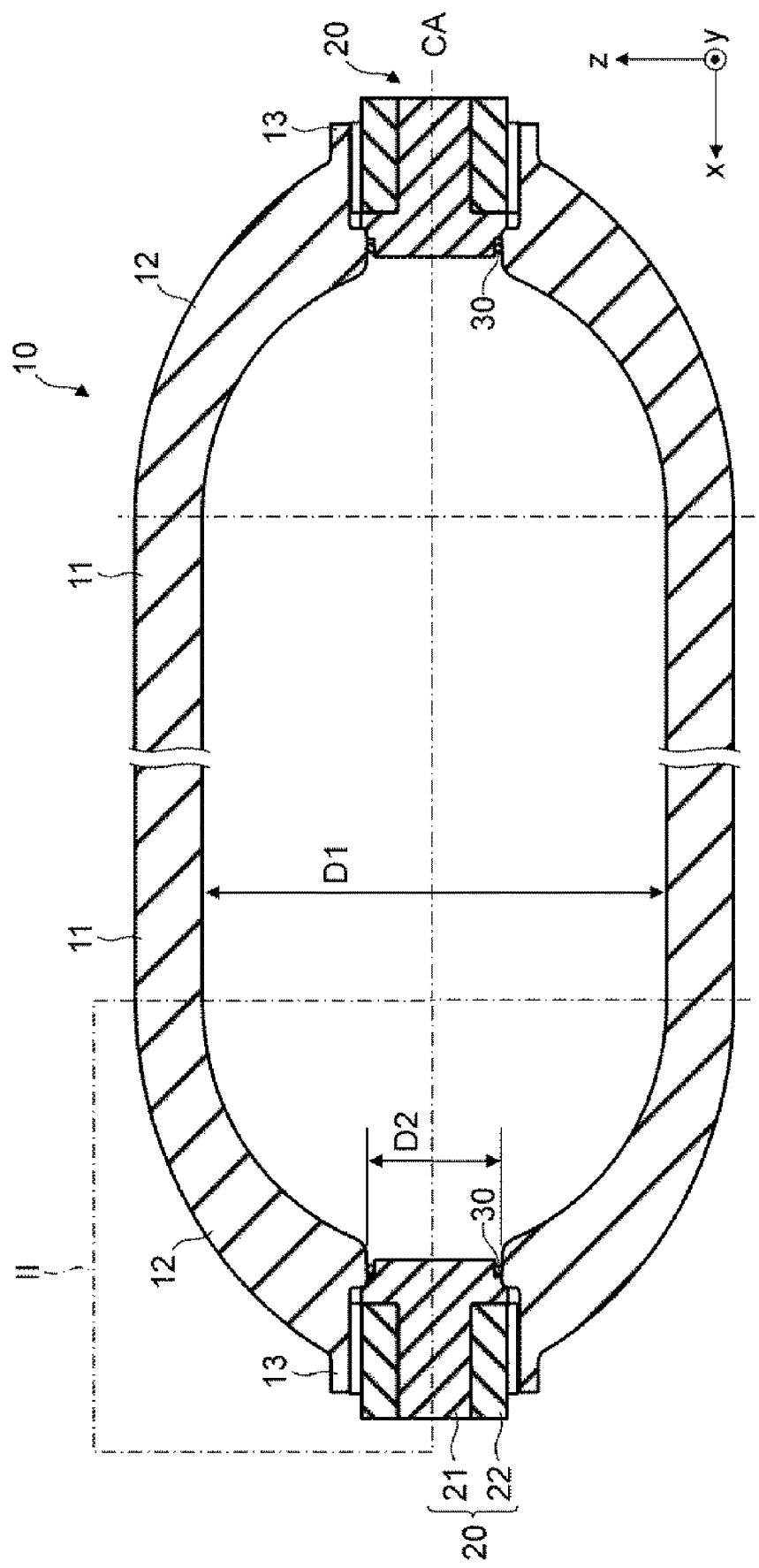
FIG. 1 is a cross-sectional view of a gas pressure vessel according to a first embodiment.
Figure 2:
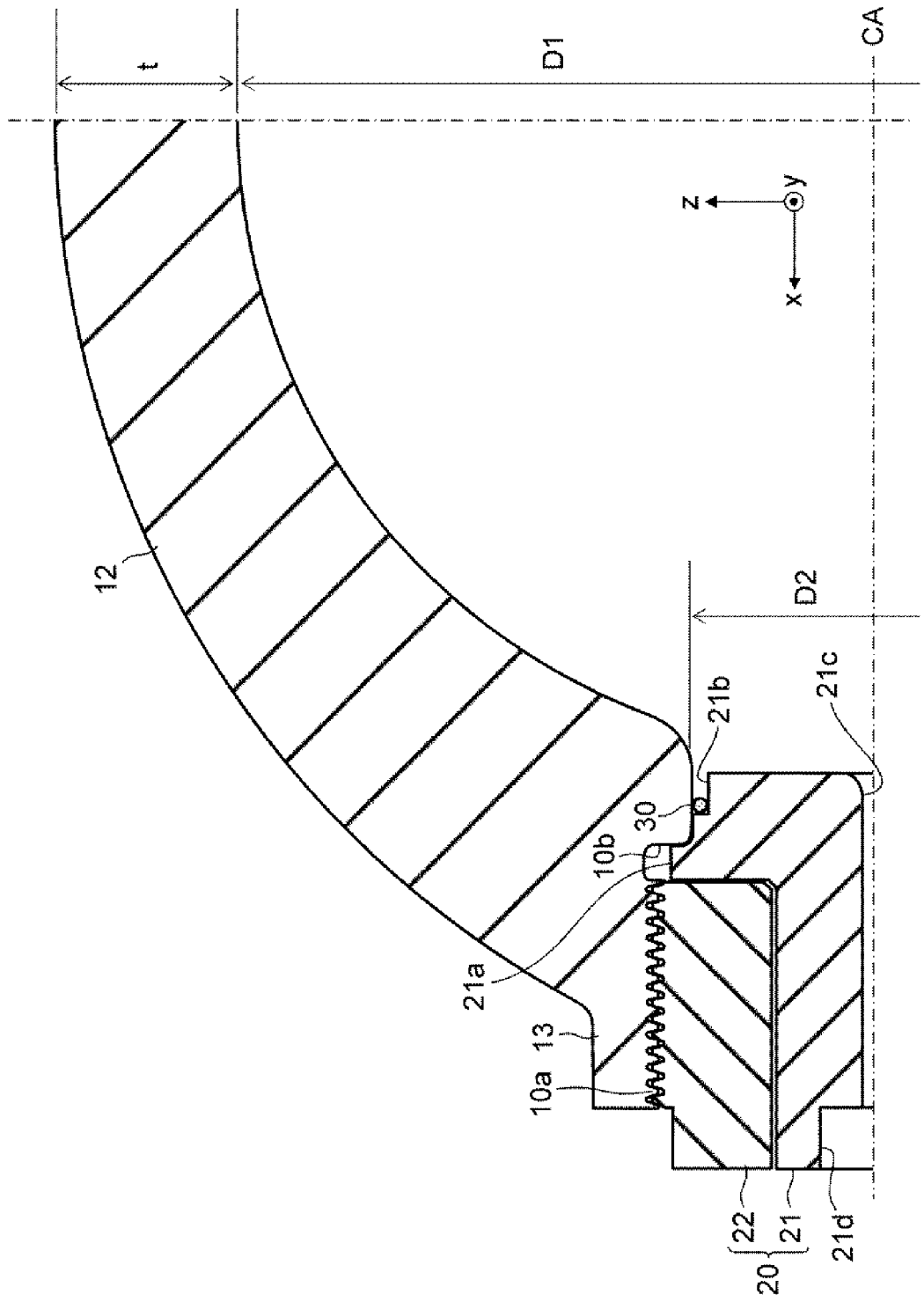
FIG. 2 is an enlarged view of an area II in FIG. 1.

Hereinafter, with reference to FIGS. 1 and 2, a structure of a gas pressure vessel according to a first embodiment will be described. FIG. 1 is a cross-sectional view of the gas pressure vessel according to the first embodiment. FIG. 2 is an enlarged view of an area II in FIG. 1. As shown in FIG. 1, the gas pressure vessel according to the first embodiment includes a body part 10, lids 20, and resin seal members 30. The gas pressure vessel according to this embodiment is, for example, a high-pressure hydrogen pressure vessel for a hydrogen station. The design pressure of the gas pressure vessel is, for example, about 70-120 MPa. Note that the gas the gas pressure vessel is filled with is not limited to hydrogen.

Note that the right-handed xyz three-dimensional orthogonal coordinate systems shown in the respective drawings, which are consistent with each other in these figures, are shown just for the sake of convenience for explaining the positional relation among components. Typically, the xy-plane forms a horizontal plane and the positive direction on the z-axis is the vertically upward direction. In the examples shown in the drawings, the longitudinal direction of the gas pressure vessel is parallel to the x-axis direction. In this way, the gas pressure vessel is typically arranged horizontally.

Referring first to FIG. 1, the whole structure of the gas pressure vessel will be described.

As shown in FIG. 1, in the gas pressure vessel according to this embodiment, the lids 20 are screwed into the respective opening ends of the body part 10 filled with hydrogen so that they can be opened and/or closed. The body part 10 is composed of a cylindrical part 11, dome parts 12, and neck parts 13 that are integrally formed.

Specifically, hemispherical dome parts 12 are extended outward from the respective opening ends of the cylindrical part 11 that is extended in the x-axis direction. A circular opening is provided at a top of each of the dome parts 12 and cylindrical neck parts 13 are protruded outward from the peripheries of the openings. Then the lids 20 are screwed into inner peripheral surfaces of the neck parts 13. The dome parts 12 are each also referred to as an end plate, a reducing part or the like.

A space surrounded by the inner surface of the body part 10 (the inner peripheral surface of the cylindrical part 11 and the inner surfaces of the dome parts 12) and the inner end surfaces of the two lids 20 is filled with high-pressure hydrogen gas. The inside of the body part 10 is sealed by the circular resin seal members 30 provided between the inner peripheral surfaces of the openings of the dome parts 12 and the outer peripheral surfaces of the lids 20.

The inner surface of the body part 10 (the inner peripheral surface of the cylindrical part 11 and the inner surfaces of the dome parts 12) and the inner end surfaces of the lids 20 that receive stress from the high-pressure hydrogen gas are each called a pressure resistant part.

Further, the lids 20 each includes a lid body 21 and a nut 22, although the details thereof will be described later.

While a structure in which both end parts of the body part 10 are opened is employed in the example shown in FIG. 1, a structure in which only one end part of the body part 10 is opened may instead be employed. Further, the outer surface of the body part 10 may be reinforced, for example, by a carbon fiber reinforced plastic layer (not shown).

The body part 10 and the lid 20 (the lid body 21 and the nut 22) are each made of, for example, a steel material such as manganese steel, chrome molybdenum steel, or nickel-chrome-molybdenum steel. The body part 10, the lid body 21, and the nut 22 may be made of steel of the same type or steel of different types. As regards suppression of occurrence of hydrogen-induced cracking, the tensile strength of the steel material is preferably 980 MPa or smaller.

For example, by drawing both end parts of a seamless pipe that forms the cylindrical part 11, the dome parts 12 and the neck parts 13 are formed. Regarding the dimensions of the body part 10, for example, the internal volume is about 50-1000 L, the total length is about 1800-8000 mm, an inner diameter D1 of the cylindrical part 11 is about 200-400 mm, and a thickness t (see FIG. 2) of the cylindrical part 11 is about 20-80 mm.

In order to reduce surface scratches, which cause cracking, a test is preferably performed after machining the inner surface of the body part 10 (in particular, the inner surfaces of the dome parts 12). It is preferable to eliminate surface scratches, for example, whose depth is 0.5 mm or greater and length is 1.5 mm or greater.

Referring next to FIG. 2, details of the lids 20 will be described. Since the structures of the two lids 20 are similar to each other as shown in FIG. 1, the structure of only the lid 20 on the side of the x-axis positive direction of the body part 10 will be described in detail in FIG. 2.

As shown in FIG. 2, the diameter of a part on the outer side (the side of the x-axis positive direction) of the opening of the dome part 12 is made larger than the diameter of a part on the inner side (the side of the x-axis negative direction) thereof. Then a female thread part 10a is formed on the inner peripheral surface from the part on the outer side whose diameter is enlarged at the opening of the dome part 12 to the neck part 13. The nut 22 of the lid 20 is screwed in the female thread part 10a.

Note that the diameter of the part on the inner side of the opening of the dome part 12 that is not enlarged is herein simply referred to as an "opening diameter of the dome part 12".

In the gas pressure vessel according to this embodiment, an opening diameter D2 of the dome part 12 is 90 mm or greater. Since the opening diameter D2 of the dome part 12 is large, like 90 mm or greater, a tool can be inserted into the dome part 12 through the opening. That is, surface scratches on the inner surface of the dome part 12 (e.g., wrinkles that occur when the dome part 12 is shaped) can be easily removed by machining or the like. Further, the presence or the absence of the surface scratches on the inner surface of the dome part 12 can be easily inspected using an endoscope or the like.

On the other hand, the opening diameter of the dome part 12 is preferably 150 mm or smaller. This is because, when the opening diameter of the dome part 12 exceeds 150 mm, easiness of processing and a test of the inner surface of the dome part 12 is no longer changed.

As the opening diameter of the dome part 12 becomes smaller, it becomes possible to prevent occurrence of cracking, which starts from a root of the thread of the female thread part 10a. Further, the size and the weight of the lid 20 is reduced, whereby the weight of the entire gas pressure vessel can be reduced.

The lid 20 that includes the lid body 21 and the nut 22 has a structure that is in compliance with a "screwing structure" specified in the standard KHKS 0220 by The High Pressure Gas Safety Institute of Japan (Non-Patent Literature 1).

As shown in FIG. 2, the lid body 21 is a cylindrical shaped member with a step having a central axis CA that is common to the body part 10. The lid body 21 includes a flange part 21a. A part of the lid body 21 having a large diameter located on the side of the x-axis negative direction with respect to the flange part 21a is referred to as a large diameter part and a part of the lid body 21 having a small diameter located on the side of the x-axis positive direction with respect to the flange part 21a is referred to as a small diameter part.

The diameter of the flange part 21a is larger than the opening diameter of the dome part 12 but smaller than the inner diameter of the neck part 13. Therefore, the lid body 21 can be inserted into the opening of the dome part 12 from the neck part 13. The flange part 21a contacts a step 10b between the part on the outer side of the opening of the dome part 12 whose diameter is enlarged and the part on the inner side of the opening of the dome part 12 whose diameter is not enlarged.

As shown in FIG. 2, the diameter of the large diameter part of the lid body 21 is substantially equal to the opening diameter of the dome part 12 and the lid body 21 is fitted into the part on the inner side of the opening of the dome part 12. An annular groove 21b for fitting the resin seal member 30 is formed on the outer peripheral surface of the large diameter part of the lid body 21.

On the other hand, the small diameter part of the lid body 21 has an axis diameter that is substantially equal to the inner diameter of the nut 22 and the lid body 21 is fitted into the through hole of the nut 22. The small diameter part of the lid body 21 and the nut 22 can be rotated relative to each other. Further, in the example shown in FIG. 2, the length of the small diameter part of the lid body 21 is substantially equal to the height of the nut 22 (the length in the x-axis direction).

Further, as shown in FIG. 2, a through hole 21c which is along the central axis CA is formed in the lid body 21. The gas is supplied from the outside to the inside or from the inside to the outside of the gas pressure vessel via the through hole 21c. An attachment port 21d for coupling a gas pipe (not shown) to the lid body 21 is formed in the central part of the outer end surface of the lid body 21. As shown in FIG. 2, the through hole 21c and the attachment port 21d communicate with each other.

The nut 22 is a male thread nut having the central axis CA that is common to the body part 10. That is, the outer peripheral surface of the nut 22 is threaded. The nut 22 is screwed into the female thread part 10a formed across the opening of the dome part 12 from the neck part 13 while inserting the small diameter part of the lid body 21 into the through hole of the nut 22, whereby the lid 20 is fixed to the body part 10.

Specifically, when the nut 22 is screwed into the female thread part 10a, the nut 22 moves forward in the x-axis negative direction. When the nut 22 presses the flange part 21a against the step 10b formed in the opening of the dome part 12, the nut 22 does not move any further and the lid body 21 and the nut 22 are fixed to the body part 10. In this way, the flange part 21a serves as a stopper when the nut 22 is screwed into the female thread part 10a.

The resin seal member 30, which is, for example, an O-ring, is a circular resin member having the central axis CA that is common to the body part 10. As shown in FIG. 2, the resin seal member 30 is provided between the inner peripheral surface of the body part 10 and the outer peripheral surface of the lid 20. More specifically, as shown in FIG. 2, the resin seal member 30 is fitted into the annular groove 21b formed on the outer peripheral surface of the large diameter part of the lid body 21. That is, the inside of the body part 10 is sealed by the resin seal member 30 that is provided between the inner peripheral surface of the main body part of the body part 10 and the outer peripheral surface of the large diameter part of the lid body 21.

Figure 3:
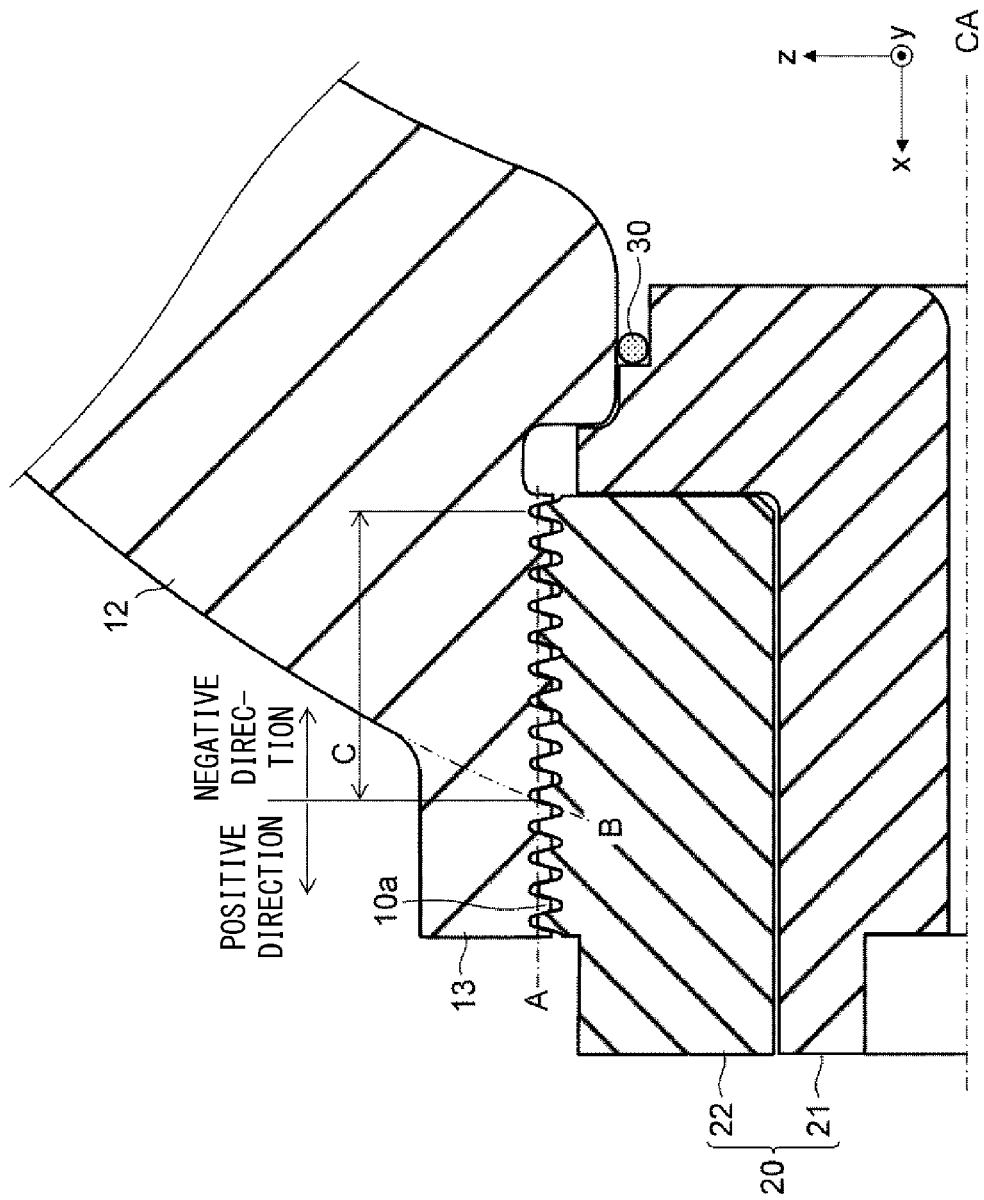
FIG. 3 is an enlarged cross-sectional view of a female thread part 10a and an area in the vicinity thereof.

Referring next to FIG. 3, the female thread part 10a will be described in further detail. FIG. 3 is an enlarged cross-sectional view of the female thread part 10a and an area in the vicinity thereof. As shown in FIG. 3, in the gas pressure vessel according to this embodiment, the root of the thread (first root of the thread) in the innermost side (the side of the x-axis negative direction) of the female thread part 10a is provided inside an imaginary plane B that is formed by extending the outer surface of the dome part 12 toward the opening. In FIG. 3, the imaginary plane B formed by extending the outer surface of the dome part 12 is indicated by the alternate long and two short dashes lines.

In other words, the first root of the thread of the female thread part 10a is formed on the inner peripheral surface of the dome part 12, not on the inner peripheral surface of the neck part 13, and is reinforced by the dome part 12. Therefore, the maximum stress applied to the female thread part 10a becomes small and thus occurrence of cracking starting from a root of the thread can be prevented.

As a result of a simulation test described later, it has been seen that the larger the distance C in the x-axis negative direction from the intersection of the imaginary plane B with an outer diameter line A of the nut 22 to the first root of the thread becomes, the smaller the maximum stress applied to the female thread part 10a has become. Typically, cracking tends to occur in the first root of the thread.

Further, as shown in FIG. 2, preferably, the closer the dome part 12 is to the opening, the larger the thickness of the dome part 12 becomes. The size of the distance C is increased and the area of the female thread part 10a reinforced by the dome part 12 can be enlarged.

EXAMPLES

Next, Examples and Comparative Examples of the gas pressure vessel according to the first embodiment will be described. The distance C in the x-axis negative direction from the intersection of the imaginary plane B with the outer diameter line A of the nut 22 to the first root of the thread shown in FIG. 3 was changed and the maximum stress applied to the female thread part 10a and fatigue life were obtained by the simulation test.

<Testing Conditions>

Hereinafter, testing conditions will be described. For the sake of convenience, as shown in FIG. 3, it is assumed that the distance C has a negative value when the first root of the thread is located in the x-axis negative direction and the distance C has a positive value when the first root of the thread is located in the x-axis positive direction with respect to the intersection of the imaginary plane B with the outer diameter line A of the nut 22. That is, the distance C has a negative value in Examples, whereas the distance C has a value of 0 or greater in Comparative Examples.

Figure 4:
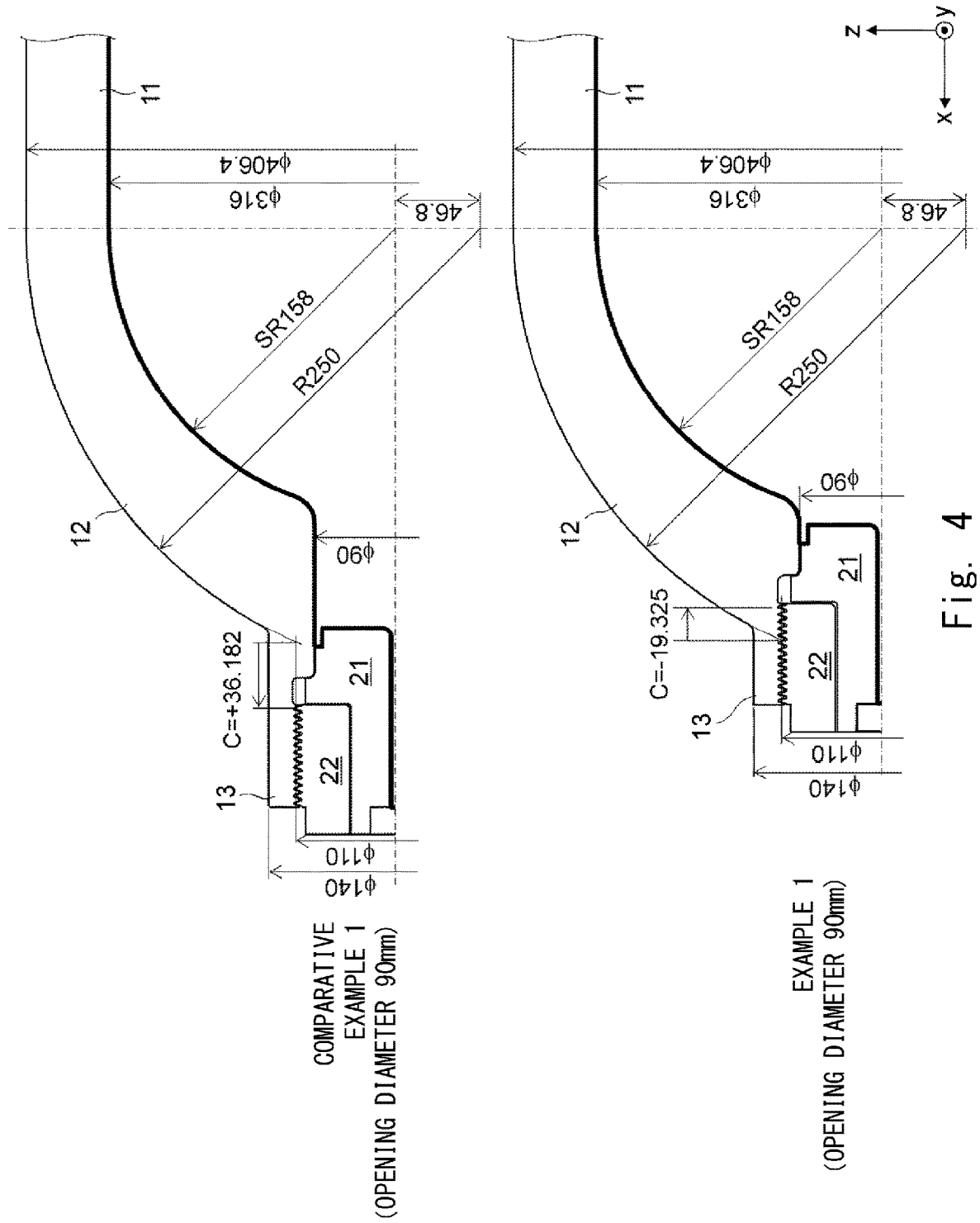
FIG. 4 is a partial cross-sectional view of a gas pressure vessel according to Example 1 and that according to Comparative Example 1 in which an opening diameter of a dome part 12 is 90 mm.
Figure 5:
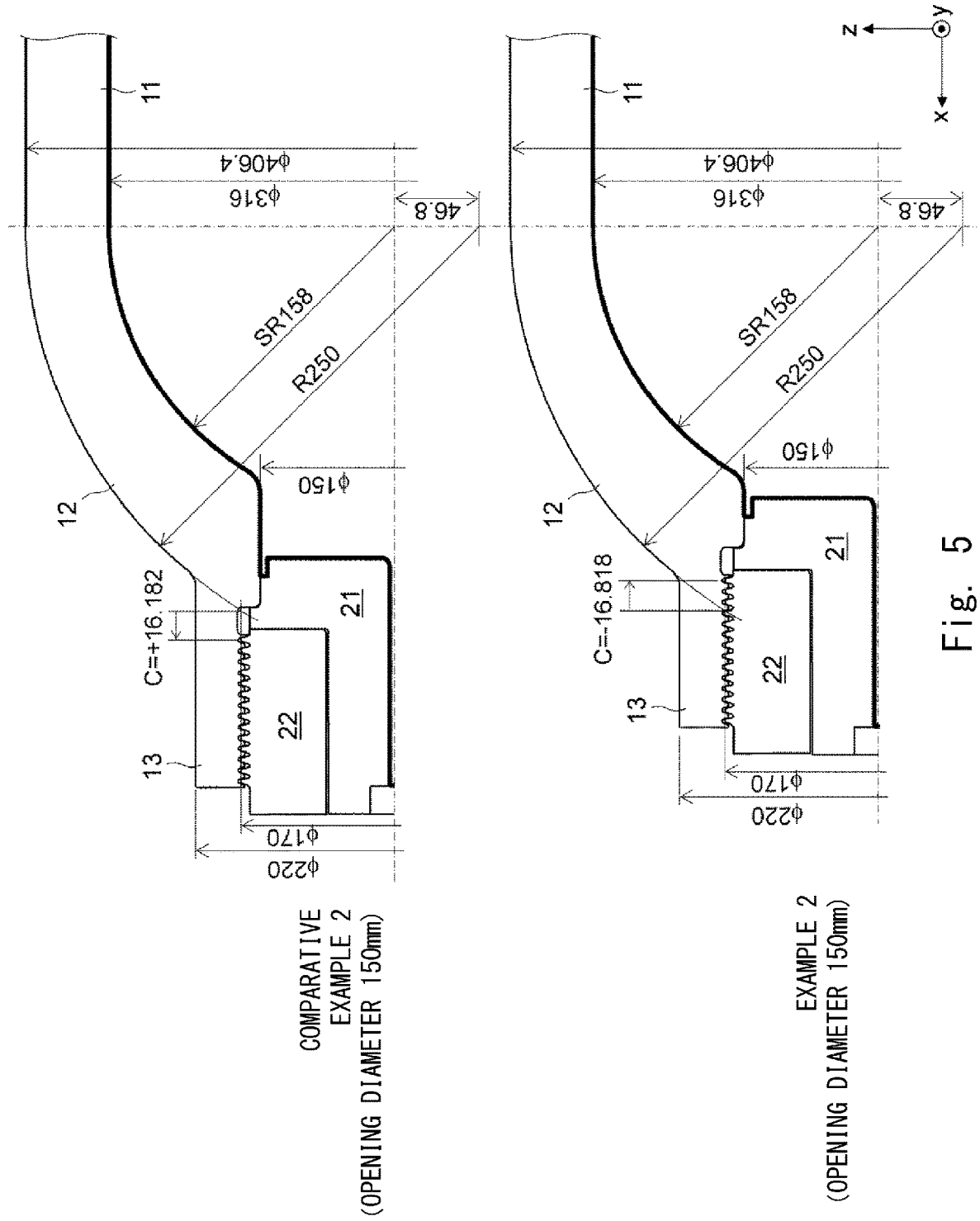
FIG. 5 is a partial cross-sectional view of a gas pressure vessel according to Example 2 and that according to Comparative Example 2 in which an opening diameter of a dome part 12 is 150 mm.

Two values, namely, 90 mm and 150 mm were used as the opening diameter of the dome part 12. Referring to FIGS. 4 and 5, the shapes and the dimensions of the gas pressure vessel according to Examples and Comparative Examples will be described.

FIG. 4 is a partial cross-sectional view of the gas pressure vessel according to Example 1 and that according to Comparative Example 1 in which the opening diameter of the dome part 12 is 90 mm. FIG. 4 shows the dimensions of the body part 10 (the cylindrical part 11, the dome part 12, and the neck part 13) and the lid 20 of the gas pressure vessel according to Example 1 and those according to Comparative Example 1 in which the opening diameter of the dome part 12 is 90 mm. The diameters other than the distance C in Example 1 are the same as those in Comparative Example 1. Specifically, the distance C according to Comparative Example 1 is 36.182 mm and the distance C according to Example 1 is −19.325 mm. That is, the length of the neck part 13 is shorter and the entire length is smaller in Example 1 than in Comparative Example 1, and therefore the size of the gas pressure vessel is reduced in Example 1.

The dimensions other than the distance C that are common in Example 1 and Comparative Example 1 will be described. As shown in FIG. 4, the inner diameter of the cylindrical part 11 is 316 mm and the outer diameter thereof is 406.4 mm. The inner surface of the dome part 12 has a spherical shape whose radius is 158 mm. The cross section of the outer surface of the dome part 12 has an arc shape whose radius is 250 mm. The center of the outer surface of the dome part 12 is deviated from the center of the inner surface of the dome part 12 in the radial direction of the cylindrical part 11 by 46.8 mm. In this way, the thickness of the dome part 12 gradually increases from the connection part where the dome part 12 contacts the cylindrical part 11 toward the opening.

The outer diameter of the neck part 13 is 140 mm and the outer diameter of the nut 22 is 110 mm.

Further, FIG. 5 is a partial cross-sectional view of a gas pressure vessel according to Example 2 and that according to Comparative Example 2 in which the opening diameter of the dome part 12 is 150 mm. FIG. 5 shows the dimensions of the body part 10 (the cylindrical part 11, the dome part 12, and the neck part 13) and the lid 20 of the gas pressure vessel according to Example 2 and those according to Comparative Example 2 in which the opening diameter of the dome part 12 is 150 mm. Specifically, the distance C according to Comparative Example 2 is 16.182 mm and the distance C according to Example 2 is −16.818 mm. That is, the length of the neck part 13 is shorter and the entire length is smaller in Example 2 than in Comparative Example 2, and therefore the size of the gas pressure vessel is reduced in Example 2.

The dimensions other than the distance C that are common in Example 2 and Comparative Example 2 will be described. As shown in FIG. 5, the dimensions other than the outer diameter of the neck part 13 and the outer diameter of the nut 22 are the same as those according to Example 1 and Comparative Example 1 shown in FIG. 4. According to Example 2 and Comparative Example 2, the opening diameter of the dome part 12 is enlarged from 90 mm to 150 mm as compared to Example 1 and Comparative Example 1, whereby the outer diameter of the neck part 13 and the outer diameter of the nut 22 are enlarged as well.

Specifically, the outer diameter of the neck part 13 is 220 mm and the outer diameter of the nut 22 is 170 mm.

Next, simulation testing conditions will be described.

As shown in FIGS. 4 and 5, two-dimensional axial symmetric elastic analysis was performed using ANSYS 18.0, which is finite element analysis software. Regarding elements, quadrangular 8 nodal point elements were used.

The pressure resistant parts that receive the internal pressure are shown by thick lines in FIGS. 4 and 5. Specifically, as shown in FIGS. 4 and 5, the inner peripheral surface of the cylindrical part 11, the inner surface of the dome part 12, the inner end surface of the lid body 21 and the like correspond to the pressure resistant parts. The internal pressure was set to 50 MPa and 82 MPa.

As a material that forms the body part 10, Cr—Mo steel (JIS standard SCM435) was assumed, the Young's modulus of the body part 10 was set to 205 GPa, and the Poisson's ratio was set to 0.3. Further, the yield stress of the body part 10 was 785 MPa and the tensile strength was 930 MPa.

As a material that forms the lid body 21 and the nut 22, Ni—Cr—Mo steel (ASME standard SA-723M Grade 3, Class 2) was assumed, the Young's modulus of the body part 10 was set to 191 GPa, and the Poisson's ratio was set to 0.3.

Regarding the above material properties, values under a room temperature (20° C.) were used.

Next, the analysis procedure will be described.

First, the stress distribution at an internal pressure of 82 MPa was obtained by the above finite element analysis. Accordingly, the maximum stress applied to the female thread part 10a was obtained.

Next, the stress distribution at an internal pressure of 50 MPa was calculated from the stress distribution at an internal pressure of 82 MPa by linear interpolation. Since the degree of the deformation is within an elastic deformation range and minute, a proportional relation is established between these internal pressures and the stress distributions.

Then the fatigue life was calculated in compliance with the technical standard KHKS 0220 by The High Pressure Gas Safety Institute of Japan, "Annex V (Provision) Fatigue analysis using optimal fatigue curve" (Non-Patent Literature 2).

<Results of Test>

Figure 6:
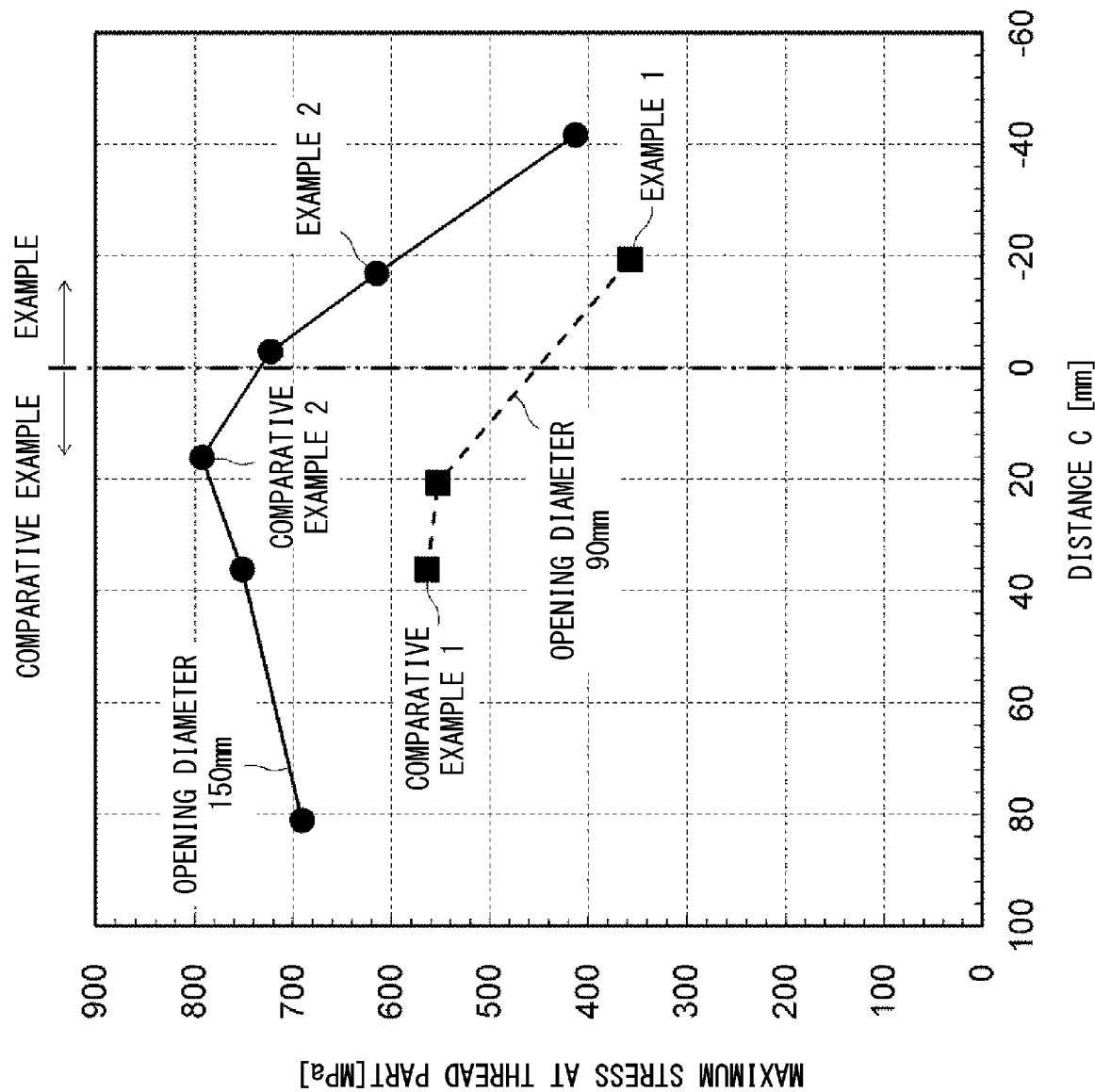
FIG. 6 is a graph showing a change of a maximum stress applied to the female thread part 10a at an internal pressure of 82 MPa depending on a distance C.
Figure 7:
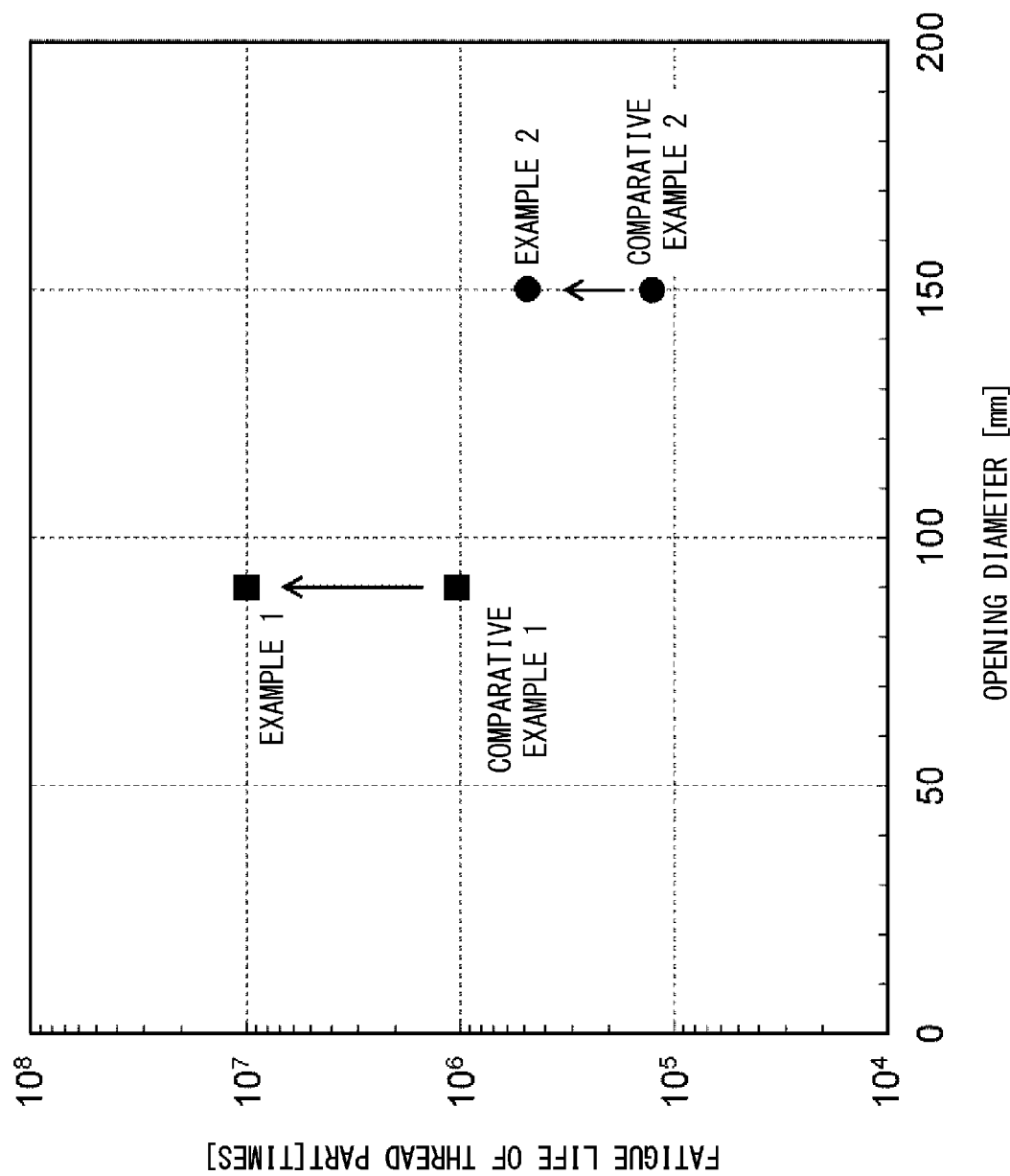
FIG. 7 is a graph showing fatigue life according to Examples 1 and 2 as compared to fatigue life according to Comparative Examples 1 and 2.

Referring next to FIGS. 6 and 7, simulation test results will be described. FIG. 6 is a graph showing a change of the maximum stress applied to the female thread part 10a at an internal pressure of 82 MPa depending on the distance C. FIG. 7 is a graph showing fatigue life in Examples 1 and 2 as compared to the fatigue life in Comparative Examples 1 and 2.

First, FIG. 6 will be described. The horizontal axis shown in FIG. 6 indicates the distance C (mm) and the vertical axis indicates the maximum stress (MPa) applied to the female thread part 10a. FIG. 6 shows a case in which the opening diameter of the dome part 12 is 90 mm and a case in which it is 150 mm arranged one below the other. FIG. 6 shows data in Comparative Example 1 and Example 1 shown in FIG. 4 and data in Comparative Example 2 and Example 2 shown in FIG. 5. As shown in FIG. 6, when the size of the distance C becomes large in the negative side, the maximum stress applied to the female thread part 10a was suddenly reduced. It can be estimated that this is because the area in which the female thread part 10a is reinforced by the dome part 12 is enlarged.

Next, FIG. 7 will be described. The horizontal axis shown in FIG. 7 indicates the opening diameter (mm) and the fatigue life (times). FIG. 7 shows data in Comparative Example 1 and Example 1 shown in FIG. 4 and data in Comparative Example 2 and Example 2 shown in FIG. 5.

In Example 1, no break occurred when the fatigue life was $10^7$. This means that fatigue life in Example 1 is larger than $10^7$ times.

As shown in FIG. 6, the maximum stress applied to the female thread part 10a in Example 1 is smaller than that in Comparative Example 1. Therefore, as shown in FIG. 7, the fatigue life in Example 1 was longer than that in Comparative Example 1. Likewise, as shown in FIG. 6, the maximum stress applied to the female thread part 10a is smaller in Example 2 than that in Comparative Example 2. Therefore, as shown in FIG. 7, the fatigue life has been improved.

The fatigue life is preferably, for example, $3\times10^5$ times or greater. The fatigue life in Example 1 and that in Example 2 both exceed $3\times10^5$ times.

As described above, in Examples in which the distance C becomes a negative value, the female thread part 10a is reinforced by the dome part 12. Accordingly, as shown in FIG. 6, the maximum stress applied to the female thread part 10a in Examples was suddenly reduced than that in Comparative Examples. As a result, as shown in FIG. 6, the fatigue life in Examples was longer than that in Comparative Examples.

Further, the length of the neck part 13 is shorter and the entire length is smaller in Examples than those in Comparative Examples, whereby it is possible to reduce the size of the gas pressure vessel.

While the disclosure made by the present inventors has been specifically described based on the embodiment, it is needless to say that the present disclosure is not limited to the embodiment and may be changed in various ways without departing from the spirit of the present disclosure.

This application is based upon and claims the benefit of priority from Japanese Patent Application No. 2018-195537, filed on Oct. 17, 2018, the disclosure of which is incorporated herein in its entirety by reference.

REFERENCE SIGNS LIST

10 Body Part
10a Female Thread Part
10b Step
11 Cylindrical Part
12 Dome Part
13 Neck Part
20 Lid
21 Lid Body
21a Flange Part
21b Annular Groove
21c Through Hole
21d Attachment Port
22 Nut
30 Resin Seal Member

The invention claimed is:

1. A gas pressure vessel configured to be filled with hydrogen gas, comprising:
a body part comprising a cylindrical part, a hemispherical dome part extended outward from an opening end of the cylindrical part, and a cylindrical neck part protruded outward from a periphery of an opening provided at a top of the dome part, the cylindrical part, the hemispherical dome part, and the cylindrical neck part being integrally formed as a single piece; and
a lid screwed into a female thread part formed on an inner peripheral surface of the neck part; and
an annular seal member configured to seal a gap between an inner peripheral surface of the opening of the dome part and an outer peripheral surface of the lid, wherein the opening of the dome part has a diameter greater than 90 mm,
an innermost root of a thread in the female thread part is inward of an imaginary plane formed by extending an outer surface of the dome part toward the opening and is outward of an inner surface of the dome part,
an outermost root of the thread in the female thread part is outward of the imaginary plane formed by extending the outer surface of the dome part,
the seal member is inward of the innermost root of the thread in the female thread part and is outward of the inner surface of the dome part, and
the seal member is fitted into an annular groove formed in an inner edge of the outer peripheral surface of the lid,
wherein a step is formed between an outer side of the opening of the dome part and an inner side of the opening of the dome part by having a diameter of the outer side of the opening of the dome part being larger than a diameter of the inner side of the opening of the dome part, the step preventing lid movement, and
the seal member is inward of the step.

2. The gas pressure vessel according to claim 1, wherein the dome part has a thickness that becomes larger toward the opening.

3. The gas pressure vessel according to claim 1, wherein a gas the gas pressure vessel is filled with has a pressure of 70 MPa or greater.

4. The gas pressure vessel according to claim 1, wherein the opening of the dome part has a diameter of 150 mm or smaller.

5. The gas pressure vessel according to claim 1, wherein a gas the gas pressure vessel is filled with is hydrogen.

6. The gas pressure vessel according to claim 1, wherein
the inner side of the opening of the dome part has a diameter greater than 90 mm, and
the innermost root of the thread is provided between the step and the neck part.

* * * * *